UNITED STATES PATENT OFFICE.

ALFONS GAMS, OF BASEL, SWITZERLAND, ASSIGNOR TO SOCIETY OF CHEMICAL INDUSTRY IN BASLE, OF BASEL, SWITZERLAND.

PROCESS FOR THE MANUFACTURE OF PRODUCT DERIVED FROM ERGOT, SOLUBLE IN WATER AND SUITABLE FOR INJECTIONS.

1,292,394.

Specification of Letters Patent.  Patented Jan. 21, 1919.

No Drawing.  Application filed October 23, 1917. Serial No. 198,041.

*To all whom it may concern:*

Be it known that I, ALFONS GAMS, chemist, a citizen of the Swiss Republic, and resident of Basel, Switzerland, have invented a new and useful Process for the Manufacture of a Product Derived from Ergot, Soluble in Water and Suitable for Injections, of which the following is a full, clear, and exact specification.

Circumstantial researches have been made since a long time on the ergot (*Secale cornutum*); the knowledge of its constituents remained however very imperfect with the exception of the paraoxyphenylethylamin. A great number of combinations have been isolated from ergot, but never the full action of this latter could be obtained with them since according to the methods of extraction employed for their preparation, either only a part of the active substances were extracted or a part of these latter were destroyed by or after the extraction. The main condition for the preparation of such a product is to extract the said active constituents of the drug, which are easily decomposable, in an unchanged and watersoluble form and to maintain the same unchanged during the further treatment.

I have now found that a product very active, soluble in water to clear solutions and suitable for injections can be prepared from ergot (*Secale cornutum*) by employing extractions in a determined succession and using as extracting agent volatile organic acids. The new process consists in extracting exhaustively the finely ground ergot freed from oil first with water and hereafter with dilute alcohol containing a volatile organic acid as for instance formic acid, acetic acid, etc. By this extraction the physiologically active bases of the ergot are transformed into salts with volatile organic acids as for instance formates or acetates. The alcoholic extract is freed from alcohol by distillation in a vacuum and from the excess of organic acid by allowing water to flow in while continuing the distillation, separated from the precipitated inactive substances by filtration and the filtered liquid and the aqueous extract are poured together and, after filtration, evaporated in a vacuum to dryness. If desired the united solutions are further diluted with water, filtered in order to separate any mucilaginous substances still present and the filtered liquid either evaporated directly in a vacuum to dryness, or evaporated in a vacuum to a small volume, filtered and brought to a determined degree of concentration calculated for the drug by adding distilled water. If desired, alcohol can be added to the liquid freed from mucilaginous substances in order to precipitate the inorganic constituents, and the filtered liquid afterward be evaporated in a vacuum to dryness or the alcohol can be distilled off from the filtered liquid, the liquid freed from alcohol evaporated to a small volume and filtered and distilled water can be added to the filtered liquid in order to bring it to a determined degree of concentration.

The process will be illustrated by the following example:

1200 gr. of *Secale cornutum* are finely ground and freed from oil for instance with petroleum ether. The dried powder is extracted first twice with water, each time with 5 liters of water, and afterward twice with alcohol containing a little formic acid, each time with 4 liters of alcohol of 80 per cent. containing 1 cubic centimeter of concentrated formic acid per liter. The alcoholic extract is freed from alcohol by distillation in a vacuum and from the excess of organic acid by adding water while continuing the distillation, evaporated to about 1 liter and added, after filtration, to the aqueous extract. The mixture is diluted with water to the double of its volume and filtered, after some charcoal has been added, if desired. The filtered liquid is evaporated in a vacuum to dryness or evaporated to a small volume, mixed with alcohol and separated by filtration from the precipitated inorganic constituents and hereafter evaporated in a vacuum to dryness. Thus are obtained 250 gr. of a yellow-brown, hygroscopic powder which is easily soluble in water and has the full action of the ergot.

The process can also be carried out in such a manner that, after the precipitation of the inorganic constituents with alcohol, this latter is distilled off in a vacuum and the mixture evaporated to a small volume, for instance to 400 cubic centimeters, filtered and the filtered liquid brought by addition of distilled water to 600 cubic centimeters, so that 1 cubic centimeter of this solution corresponds to 2 gr. of the employed drug (ergot).

Instead of the formic acid indicated in the example another convenient volatile organic acid, as for instance acetic acid, can be employed. Also the other conditions indicated in the example can be varied within large limits.

The product thus derived from ergot, which contains the active constituents of this drug, is distinguished from the known products derived from ergot by a more clear color, a greater efficiency and a less irritant action. With its solutions picric acid and Meyer's re-agent give small precipitates, while prosphotungstic acid and tannin give voluminous precipitates. With mercury chlorid the same solutions form a caseous precipitate.

If an aqueous solution of the product, to which ammonia has been added, be shaken with ether, the separated extract layer be floated on concentrated sulfuric acid containing nitric acid, a blue to violet zone is formed. By floating an aqueous solution of the product on Fröhdes re-agent or by floating this latter on an aqueous solution of the new product, a beautiful olive-green zone is formed.

What I claim is:

1. The herein described process for the manufacture of a very active product derived from ergot (*Secale cornutum*), soluble in water and suitable for injections, consisting in extracting exhaustively the ergot pulverized and freed from oil successively with water and with dilute alcohol, containing small quantities of a volatile organic acid, freeing first the alcohol extract from alcohol by distillation in a vacuum, and afterward from the excess of volatile organic acid by adding water while continuing the distillation, filtering the thus treated alcoholic extract and pouring both extracts together, filtering the mixture and evaporating the same to dryness in a vacuum.

2. The herein described process for the manufacture of a very active product derived from ergot (*Secale cornutum*), soluble in water and suitable for injections, consisting in extracting exhaustively the ergot pulverized and freed from oil successively with water and with dilute alcohol containing small quantities of a volatile organic acid, freeing first the alcoholic extract from alcohol by distillation in a vacuum, and afterward from the excess of volatile organic acid by adding water while continuing the distillation, filtering the thus treated alcoholic extract and pouring both extracts together, diluting further the united extracts with water, filtering, evaporating the filtered liquid in a vacuum to a small volume, filtering again and adding distilled water in order to bring the liquid to a determined degree of concentration.

In witness whereof I have hereunto signed my name this 27th day of September, 1917, in the presence of two subscribing witnesses.

ALFONS GAMS.

Witnesses:
H. H. DICK,
AMAND RITTER.